(12) United States Patent
Rudy et al.

(10) Patent No.: US 6,854,590 B2
(45) Date of Patent: Feb. 15, 2005

(54) CONVEYOR BELT ASSEMBLY

(75) Inventors: Norman A. Rudy, Snohomish, WA (US); Daniel F. Wilson, Mountlake Terrace, WA (US)

(73) Assignee: FMC Technologies, Inc., Chicago, IL (US)

( * ) Notice: Subject to any disclaimer, the term of this patent is extended or adjusted under 35 U.S.C. 154(b) by 159 days.

(21) Appl. No.: 10/068,470

(22) Filed: Feb. 5, 2002

(65) Prior Publication Data

US 2003/0019723 A1 Jan. 30, 2003

Related U.S. Application Data

(60) Provisional application No. 60/307,651, filed on Jul. 24, 2001.

(51) Int. Cl.[7] ................................................ B65G 15/42
(52) U.S. Cl. .................... 198/690.2; 198/692; 198/853; 83/53; 83/177
(58) Field of Search ............................ 198/690.2, 692, 198/853; 83/53, 177

(56) References Cited

U.S. PATENT DOCUMENTS

| | | | |
|---|---|---|---|
| 551,644 A | 12/1895 | McPherson | |
| 1,465,959 A | 8/1923 | Winter | |
| 1,465,960 A | 8/1923 | Winter | |
| 2,619,306 A | 11/1952 | Van Lake | |
| 2,909,271 A | * 10/1959 | Taylor | ...................... 198/690.2 |
| 3,889,803 A | 6/1975 | White | |
| 4,112,797 A | 9/1978 | Pearl | |
| 4,312,254 A | 1/1982 | Pearl | |
| 4,646,911 A | 3/1987 | Pearl et al. | |
| 4,799,415 A | 1/1989 | Gerdes | |
| 5,261,527 A | 11/1993 | Krismanth et al. | |
| 5,372,246 A | 12/1994 | van Aalst | |
| 5,415,274 A | 5/1995 | Krismanth et al. | |
| 6,098,512 A | * 8/2000 | Life et al. | ....................... 83/53 |
| 6,202,833 B1 | 3/2001 | Greer | |

* cited by examiner

*Primary Examiner*—Joseph E. Valenza
(74) *Attorney, Agent, or Firm*—Christensen O'Connor Johnson Kindness PLLC

(57) ABSTRACT

A conveyor belt assembly (10) for conveying an object to be portioned (54) by a fluid jet (52) is disclosed. The conveyor belt assembly (10) includes a conveyor belt formed from at least a first and a second picket (12) each having a length comprised of a sequence of geometrically shaped links (20) disposed transversely across the conveyor belt. The pickets (12) are disposed in a nested relationship to each other. The pickets (12) include upper edge portions (22) that form a conveying surface (42) for supporting and advancing the object to be portioned (54). The upper edge portions (22) are tapered in the upward direction to reduce dispersion of the fluid jet (52) during impingement of the fluid jet (52) on the conveying surface (42).

27 Claims, 11 Drawing Sheets

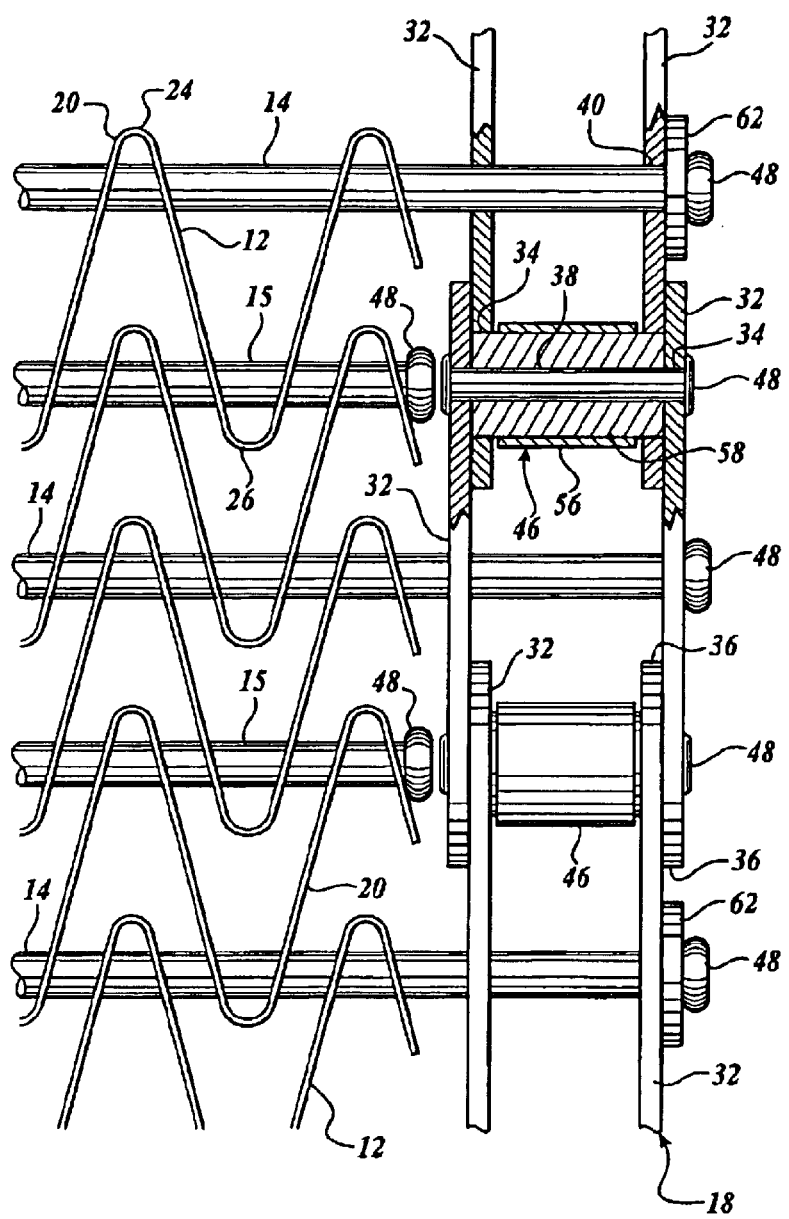 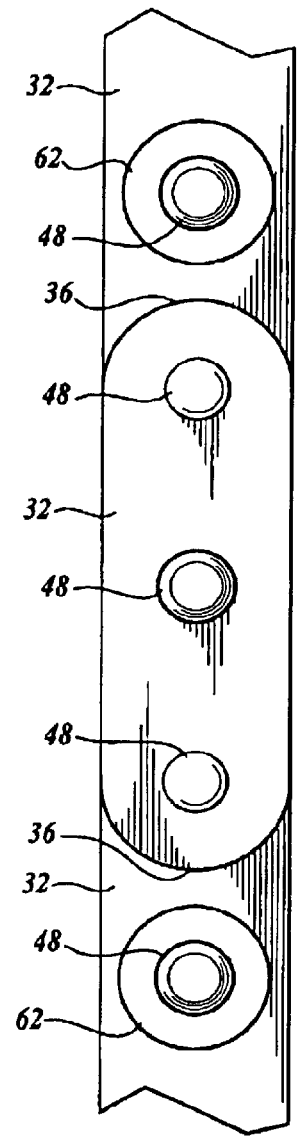
*Fig. 5.*  *Fig. 6.*

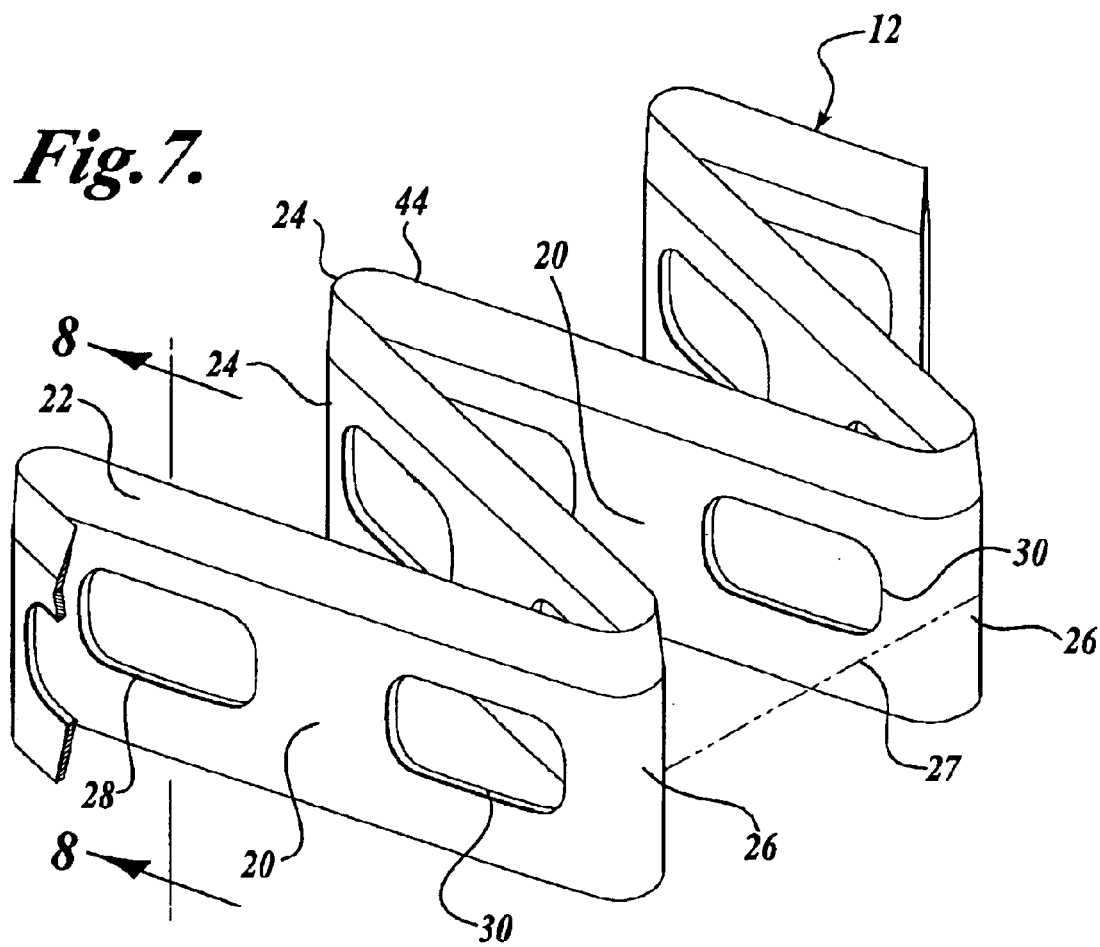

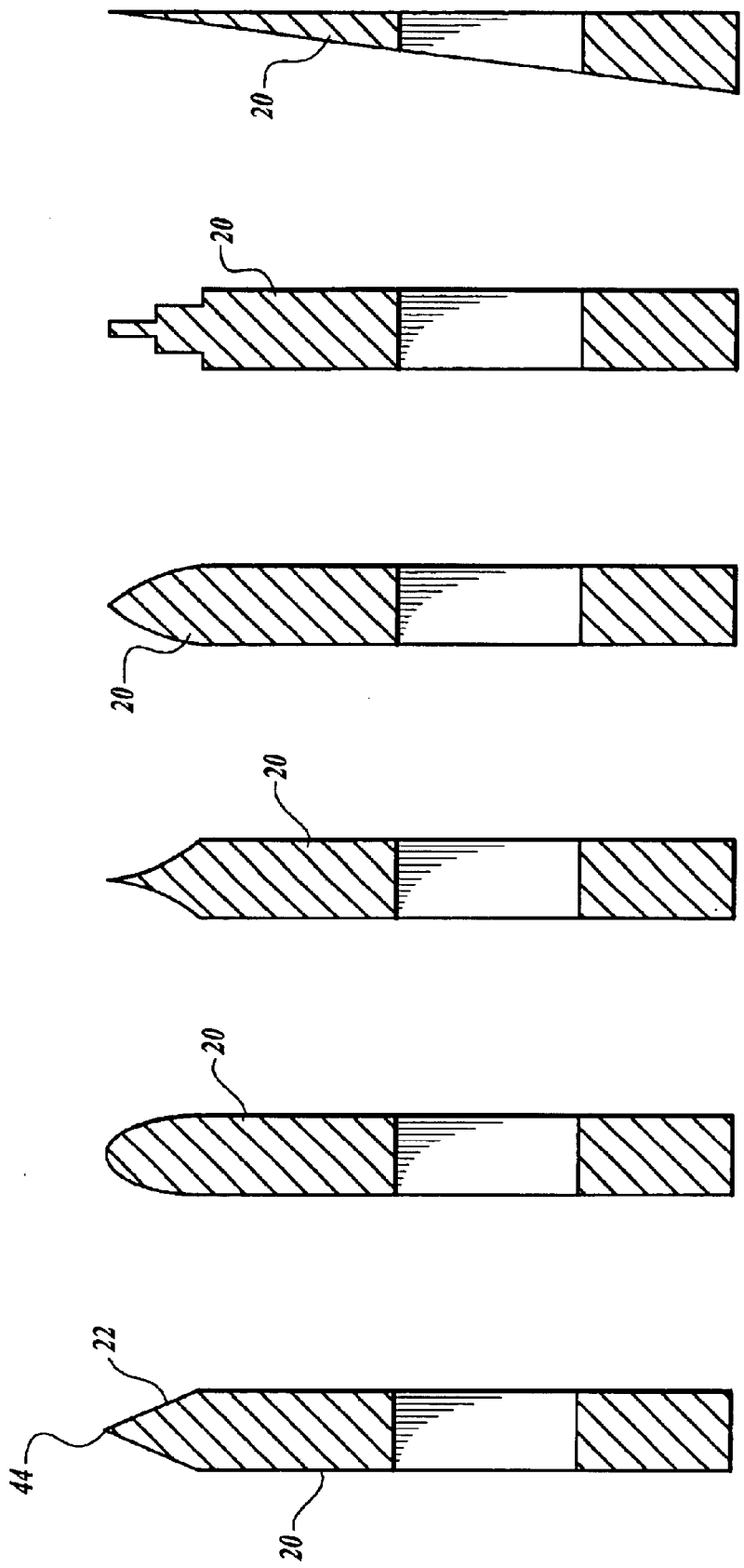

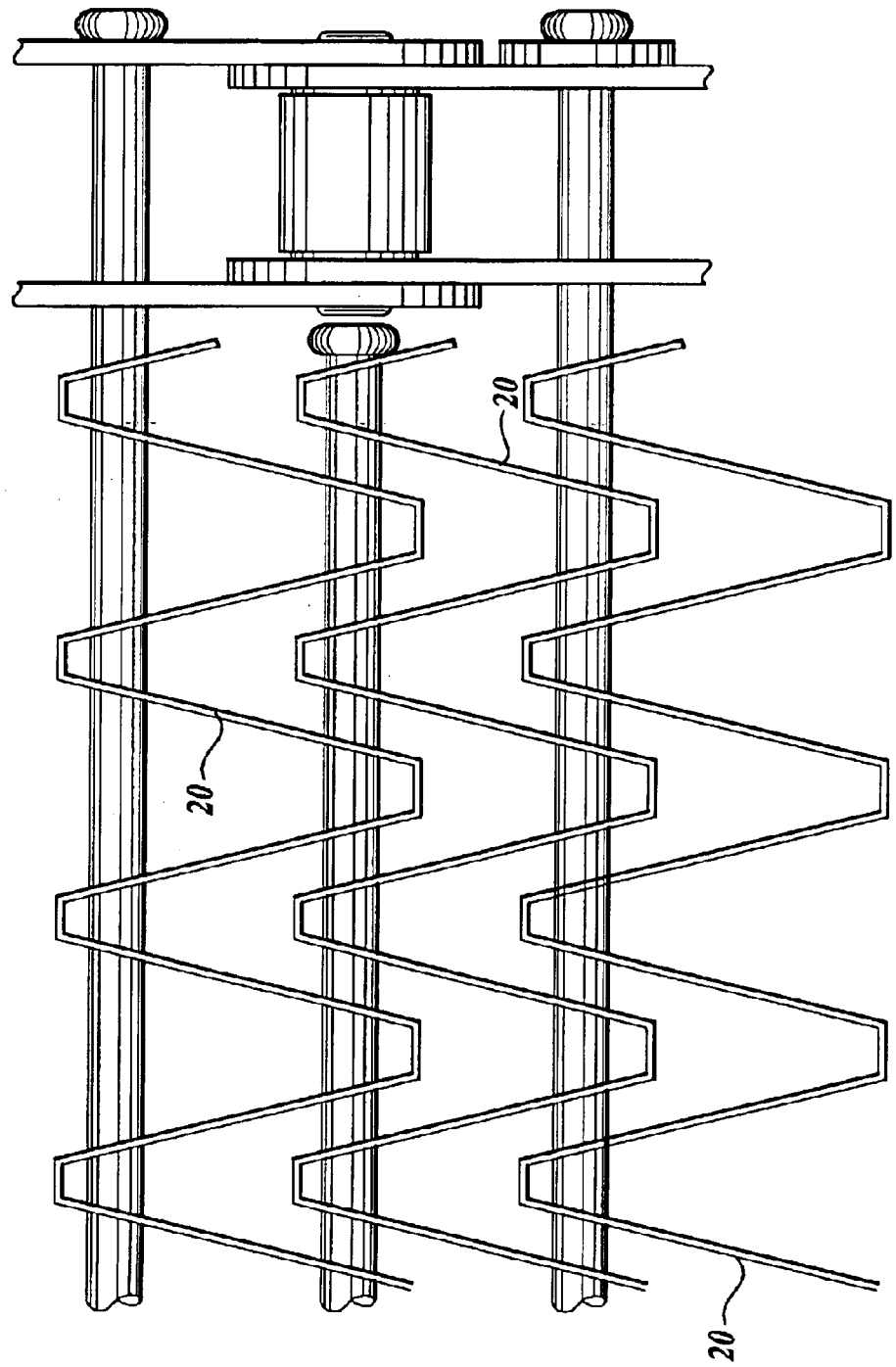

CONVEYOR BELT ASSEMBLY

CROSS-REFERENCE TO RELATED APPLICATION

This application claims the benefit of U.S. Provisional Application No. 60/307,651, filed Jul. 24, 2001, the disclosure of which is hereby expressly incorporated by reference and priority from the filing date of which is hereby claimed under 35 U.S.C. § 119.

FIELD OF THE INVENTION

The present invention relates generally to conveyor belts, and more particularly, to conveyor belts for conveying objects to be portioned by high-speed fluid jets.

BACKGROUND OF THE INVENTION

Manufacturing processes of most products generally include the portioning of a raw or intermediary material into a desired shape or weight. In the food industry in particular, portioning systems are routinely used to trim foodstuffs into uniform sizes—for example, for steaks to be served at restaurants, chicken fillets in frozen dinners, or in chicken burgers. Also, excess fat, bone, and other foreign or undesired materials are routinely trimmed from foodstuffs. Much of the portioning/trimming of materials, in particular food products, is now carried out with the use of high-speed portioning machines utilizing high-speed fluid jets to portion objects conveyed upon a conveyor belt assembly.

High-speed fluid jets impinge the product with a thin, high-velocity stream of water or other fluid. Pressurized fluid is ejected from a small orifice to create the high-speed stream or jet, as is well known in the art. When the fluid jet impinges on the target product, a thin slice of material is removed, preferably without any appreciable amount of cutting fluid being absorbed into the product.

The portioning machines use various scanning techniques to ascertain the size and shape of the food product as it is advanced on a conveying surface. This information is analyzed with the aid of a computer, which in turn directs a mobile high-speed fluid jet to portion the food product advanced on the conveying surface into the desired shape or weight.

A conveyor belt assembly used with such a portioning machine must not restrict the rapid removal of the cutting fluid from the conveying surface. One method of accomplishing this is to provide a conveyor belt assembly having a conveying surface formed from a lattice network of support members. The voids between the support members of the lattice network allow spent cutting fluid to drain from the conveying surface, or to pass through the conveying surface, and into a spent cutting-fluid receiver.

Although existing conveyor belt assemblies of a lattice type design are capable of conveying products for use in portioning machines utilizing fluid jets, they are not without problems. First, the conveyor belt assemblies have impediments to rapid water removal—such as valleys, horizontal surface areas, or other configurations that impede rapid cutting-fluid removal. Therefore, cutting fluid can accumulate on the conveyor surface, thereby increasing the potential that the position of the product on the conveying surface will be disrupted by floating the product or its position disrupted by direct impact of ricocheted (splashed back) cutting fluid from the fluid jet.

Further, these impediments to rapid cutting-fluid removal also subject the object to be portioned to increased fluid absorption, and also increase the amount of splash of the cutting fluid upon impingement of the conveyor belt assembly. Increased splash causes a corresponding increase in fluid released to the work environment, and also increases the absorption of the cutting fluid into the object to be portioned. The impact of the splash can also cause shifting of the belt and the objects to be portioned, resulting in less precise cutting or portioning than desired. Further yet, these impediments subject the conveying surface to increased rates of wear, since the fluid jet more directly impinges upon their surfaces.

Further, existing conveying systems lack a top surface that provides a sufficient gripping surface to hold and maintain the position of objects to be portioned. Still further yet, the impediments cause the fluid jet to be disrupted as it attempts to pass through the conveyor surface. This disruption of the fluid jet disrupts the collection of the spent cutting fluid as the fluid jet is dispersed in a wide range of directions, impeding its flow directly into the spent cutting-fluid collection means.

Further still, existing lattice type conveyor belts are prone to having varying distances between adjacent lattices as measured along the length of the belt. During typical portioning operations, the object to be portioned is scanned at a first location and the position of the object recorded relative to the conveyor belt. Further downstream, the object is portioned. The accuracy of the portioning operation depends on keeping track of the product position form the time it is scanned to the time it is portioned. Therefore, a belt that has inconsistencies in distances between adjacent lattices can decrease the accuracy of the portioning.

Thus, there exists a need for a conveyor belt assembly that is substantially resistant to wear, minimizes absorption of the fluid jet into the product to be portioned, reduces the splash of the fluid jet upon impingement with the conveying surface, minimizes the splash back of the fluid jet from the conveyor belt during portioning to reduce the movement of the object being portioned, provides a conveyor surface exhibiting increased gripping capabilities, provides minimal disruption of the fluid jet upon impact with the conveying surface, and maintains consistent distances between adjacent lattices.

SUMMARY OF THE INVENTION

In accordance with certain embodiments of the present invention, a conveyor belt assembly for conveying an object to be portioned by a fluid jet is provided. The conveyor belt assembly includes a conveyor belt formed from at least a first and a second picket each having a length comprised of a sequence of geometrically shaped links disposed transversely across the conveyor belt. The pickets include upper edge portions that form a conveying surface for supporting and advancing the object to be portioned. The upper edge portions are tapered in the upward direction to reduce dispersion of the fluid jet during impingement of the fluid jet on the conveying surface.

In accordance with further aspects of the invention, the pickets of the conveyor belt are disposed in a nested relationship to each other. In accordance with other aspects of the invention, the first picket is pivotally attached to the second picket by a rod inserted through at least one link of the first picket and at least one link of the second picket. In accordance with additional aspects of the invention, the rods are heat-treated or otherwise hardened to resist water erosion, thereby increasing the expected useful life of the conveyor belt.

In accordance with still yet other aspects of the invention, the links have a first end facing a first direction, and a second end facing an opposing direction. The first ends of the links of the first picket are shaped and dimensioned to be received within the second ends of the links of the second picket in a nested relationship. In further aspects of the invention, the pickets are comprised of a sequence of geometrically shaped links selected from a group consisting of triangular shaped links, quadrilateral shaped links, curved shaped links, saw tooth shaped links, and sinusoidal shaped links.

In further yet aspects of the invention, the conveyor belt assembly includes a first drive chain and a second drive chain, wherein the first drive chain is positioned along a first side of the conveyor belt and the second drive chain along a second side of the conveyor belt. The drive chains are coupled to the conveying surface and can be driven to impart motion to the conveying surface.

In still further yet aspects of the invention, the links have a tapering of the width of the links. In some embodiments of the invention, the tapering includes linear tapering, rounded tapering, concave tapering, convex tapering, stepped tapering, tapering on one side of the links, tapering along the entire height of the links, and tapering along a portion of the height of the links.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a fragmentary plan view of several interconnected pickets of the type shown in FIG. 1, coupled to a drive chain, where a portion of the drive chain is shown in sectional to illustrate the means by which the pickets are attached to the drive chain;

FIG. 6 is a planar side view of the fragment of the conveyor belt assembly shown in FIG. 5;

FIG. 7 is a perspective view of a portion of a picket suitably used with the conveyor belt assembly depicted in FIG. 1, illustrating the triangular wave pattern of the picket formed by joining a plurality of triangular shaped links, with the connecting rods removed for clarity;

FIG. 8 is a cross-sectional view of one of the links illustrated in FIG. 7, the cross-section taken substantially through SECTION 8—8 of the link shown in FIG. 7, showing a linear tapering of the top end of the link;

FIG. 9 is a cross-sectional view of an alternate embodiment of one of the links illustrated in FIG. 7 and suitably used with the conveyor belt assembly of FIG. 1, showing a rounded tapering of the top end of the link;

FIG. 10 is a cross-sectional view of an alternate embodiment of one of the links illustrated in FIG. 7 and suitably used with the conveyor belt assembly of FIG. 1, showing a concave tapering of the top end of the link;

FIG. 11 is a cross-sectional view of an alternate embodiment of one of the links illustrated in FIG. 7 and suitably used with the conveyor belt assembly of FIG. 1, showing a convex tapering of the top end of the link;

FIG. 12 is a cross-sectional view of an alternate embodiment of one of the links illustrated in FIGS. 7 and suitably used with the conveyor belt assembly of FIG. 1, showing a stepped tapering of the top end of the link;

FIG. 13 is a cross-sectional view of an alternate embodiment of one of the links illustrated in FIG. 7 and suitably used with the conveyor belt assembly of FIG. 1, showing a linear tapering of one side of the link;

FIG. 14 is a fragmentary plan view of an alternate embodiment of the pickets suitably used with the conveyor belt assembly of FIG. 1, showing the pickets formed in a square-wave pattern;

DETAILED DESCRIPTION OF THE PREFERRED EMBODIMENT

The present invention relates to a new design for a conveyor belt assembly that is particularly suitable for supporting objects to portioned, and more particularly for supporting objects to be portioned during fluid jet cutting operations. It should be noted that for purposes of this description, terminology such as left, right, vertical, horizontal, etc., are descriptive in nature and should not be construed as limiting.

Figure 1:
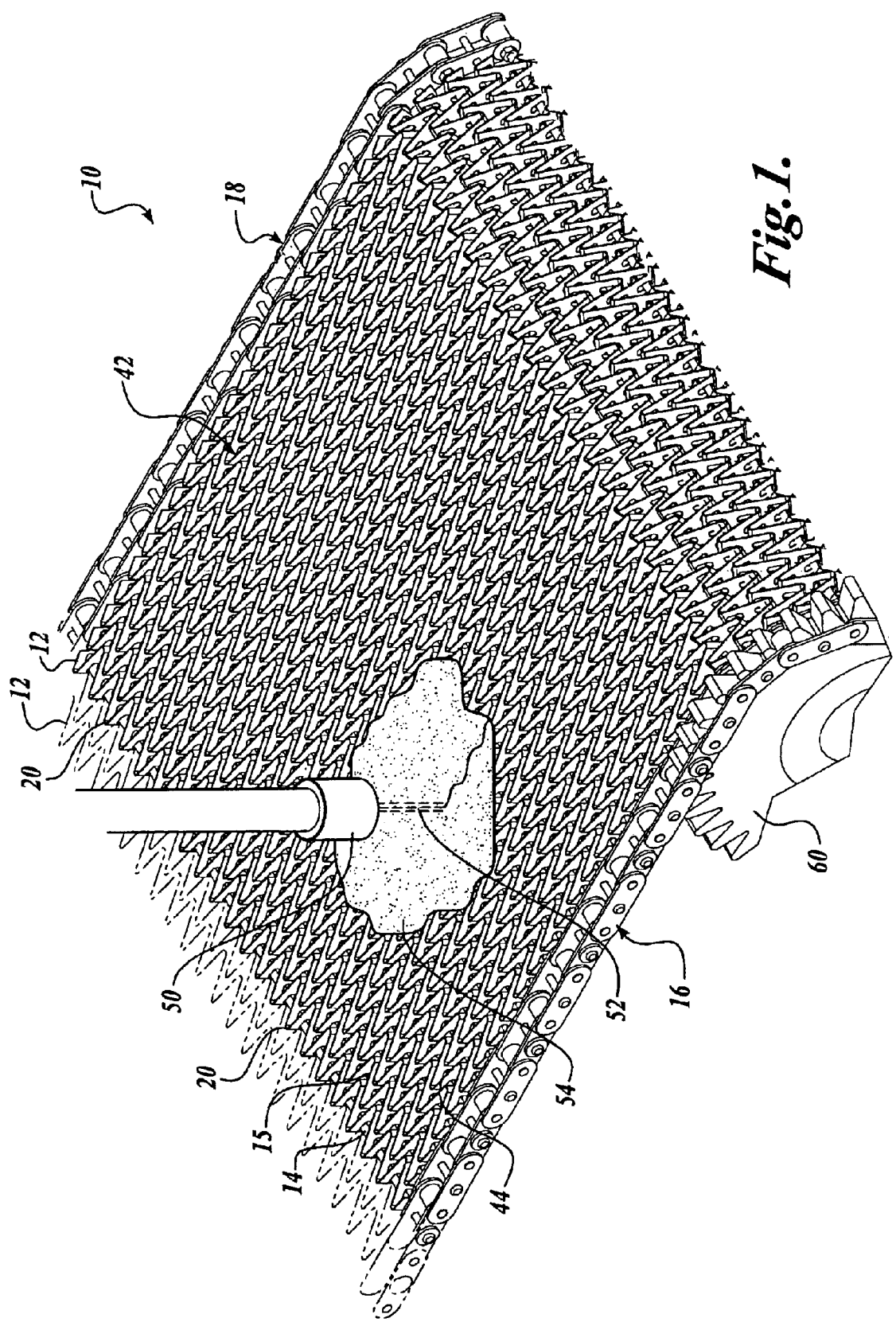
FIG. 1 is an perspective view of a conveyor belt assembly formed in accordance with one embodiment of the present invention showing an object conveyed on a conveying surface being portioned by a high-speed fluid jet.
Figure 2:
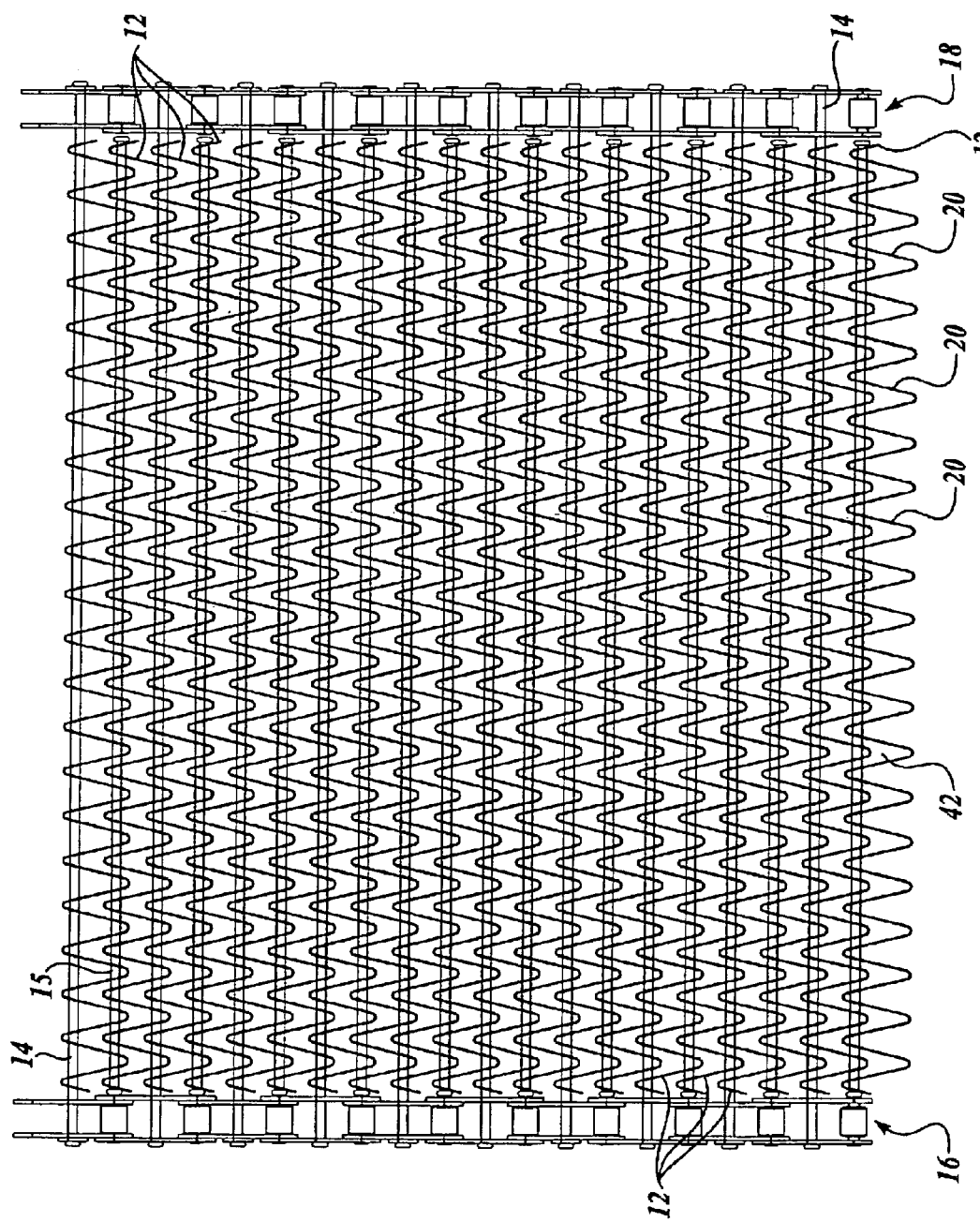
FIG. 2 is fragmentary plan view of the conveyor belt assembly shown in FIG. 1 with the object to be portioned and the fluid jet removed for clarity.

Referring to FIGS. 1 and 2, the conveyor belt assembly 10 is comprised of a conveying surface 42 formed from a plurality of pickets 12. The pickets 12 are pivotally joined to one another and to a left and right drive chain 16 and 18 by a plurality of connecting rods 14 and 15.

Referring specifically to FIG. 2, the connecting rods 14 and 15 are elongate shafts that extend transversely and horizontally just below the conveying surface 42. The connecting rods 14 and 15 are inserted through the pickets 12, pivotally joining adjacent pickets 12 to one another, and pivotally joining the pickets 12 to the drive chains 16 and 18. The connecting rods 14 and 15 are formed from heat treated or otherwise hardened metals to resist fluid erosion during impingement of the high-speed fluid jet upon the connecting rods 14 and 15.

The connecting rods 14 and 15 are of two lengths. The longer connecting rods 14 are of sufficient length to extend fully through both the left and the right drive chains 16 and 18. The shorter connecting rods 15 are of sufficient length to span between the inboard sides of the left and right drive chains 16 and 18, but not through the drive chains 16 and 18. More specifically, the shorter connecting rods 15 terminate prior to reaching the drive chains 16 and 18 and are not directly coupled to the drive chains 16 and 18.

Figure 4:
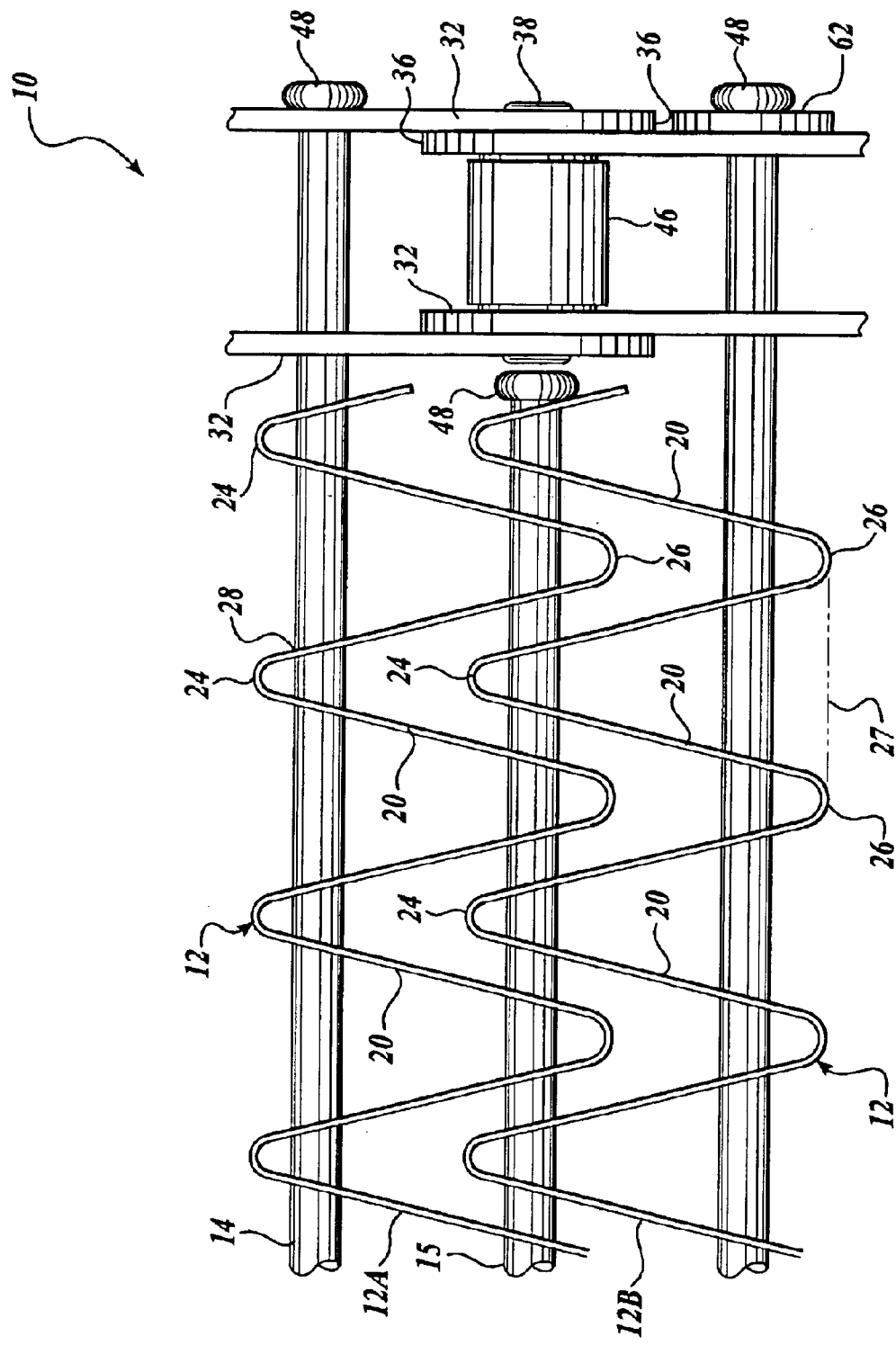
FIG. 4 is a fragmentary plan view of a first and a second picket shown in FIG. 1, pivotally coupled to one another and a drive chain through the use of connecting rods in accordance with one embodiment of the present invention.

Referring now to FIGS. 2 and 4, each picket 12 in the illustrated embodiment has a length formed from a single strand of flat wire. The flat wire is repetitively bent to form links 20, where each link is an individual "wave" in the elongate wave-shape of the pickets 12. The pickets 12 are coupled to the left and the right drive chains 16 and 18 so that the length of the pickets 12 is perpendicular relative to the longitudinally oriented length of the drive chains 16 and 18.

Figure 3:
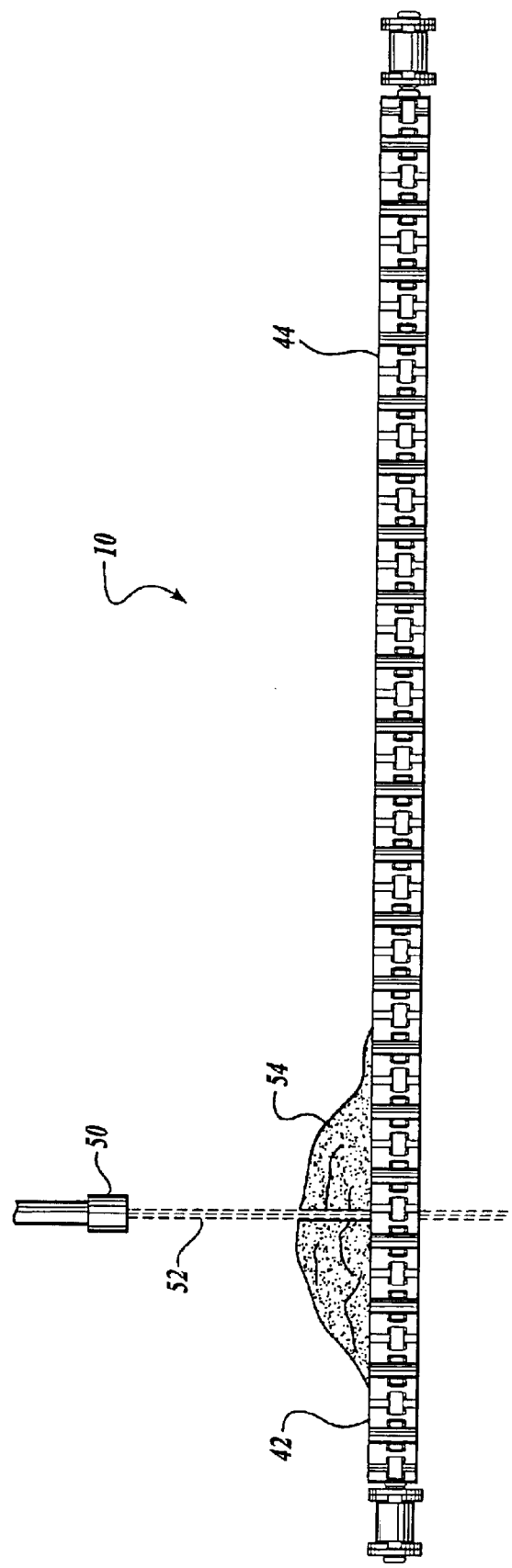
FIG. 3 is an elevation view of the conveyor belt assembly shown in FIG. 2, depicting an object conveyed upon the conveying surface being portioned by a high-speed fluid jet.

The orientation of the strands of flat wire is selected so that the imaginary plane containing the strands of flat wire is parallel with the average angle of attack of the fluid jet 52, as best seen in FIG. 3, so that the pickets 12 present a minimal surface area for impingement by the fluid jet. For illustrative purposes only, the strands of flat wire in the illustrated embodiment are oriented parallel with an imaginary vertical plane, however it is apparent to one skilled in the art that other angles of orientation may be selected and are within the scope of this invention.

Referring to FIGS. 4 and 7, as discussed briefly above, the pickets 12 are formed from a plurality of links 20 where each link 20 is integrally joined to a transversely adjacent link 20 to form the length of the pickets 12. In the case of the illustrated embodiment, the flat wire is bent during manufacture to have links 20 in the form of isosceles triangles having interior angles of roughly 30, 75, and 75 degrees. The 30 degree interior angle is located at an apex 24 of the triangular shaped link 20, and the 75 degree interior angles are located on an imaginary base 27 defined by a line dissecting the nadirs 26 of the triangular shaped links 20.

Figure 15:
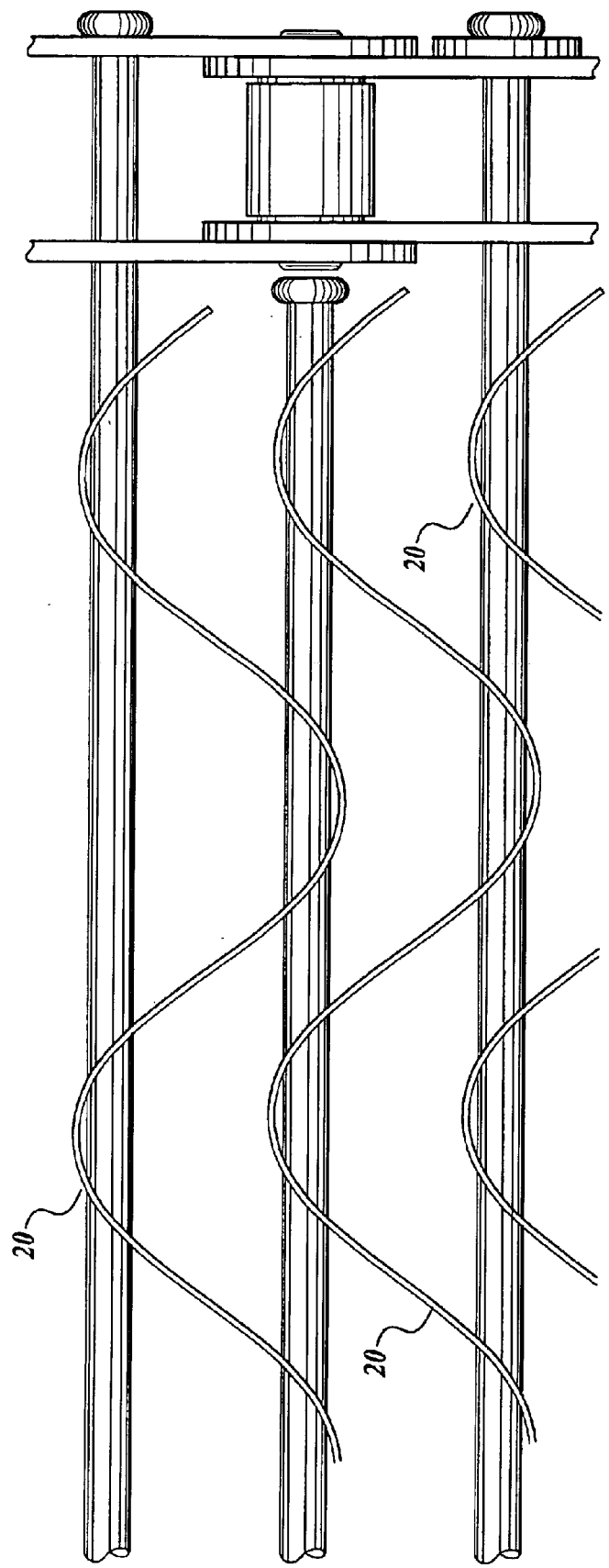
FIG. 15 is a fragmentary plan view of an alternate embodiment of the pickets suitably used with the conveyor belt assembly of FIG. 1, showing the pickets formed in a smoothly varying undulatory wave pattern.

The links 20, when joined to the nadirs 26 of the transversely adjacent links 20, create elongate pickets 12 in the form of a triangular-shaped wave having constant amplitude and frequency. Although triangular-shaped links 20 are shown, it will be readily apparent to one of skill in the art that any number of geometric shapes may be selected and are within the scope of the present invention, including for example, square-wave shaped links 20 as shown in FIG. 14 and smoothly varying undulatory links 20 as shown in FIG. 15. And further, although adjacent links 20 were joined by integrally forming the links 20 with transversely adjacent links 20 in the illustrated embodiment, it is also readily apparent to one of skill in the art that the links 20 may be separate non-integral entities joined rigidly, flexibly, pivotally, or by other means, to adjacent links 20 by any number of methods well know in the art.

Referring to FIG. 7, the links 20 are made from flat strips of material, such as ribbon wire or flat wire, having an upper edge portion 22 that defines a top surface 44. The top surfaces 44 of the links 20, in aggregate, form the conveying surface. The links 20 are tapered along their upper edge portion 22 to form a relatively sharp edge at their top surface 44. The tapering of the links 20, among other things, aids in the minimization of the splash of the fluid jet during impingement of the fluid jet upon the top surfaces 44 of the links 20. It also provides a sharpened surface to grip the product conveyed. Although both sides and only the upper edge portion 22 of the link 20 is tapered in a linear manner in the illustrated embodiment, it is readily apparent to one of skill in the art that any number of methods for tapering the links 20 are within the scope of this invention including, but not limited to, the following: linear tapering as shown in FIG. 8, rounded tapering as shown in FIG. 9, concave tapering as shown in FIG. 10, convex tapering as shown in FIG. 11, or stepped tapering as shown in FIG. 12. Further, the tapering may occur along one side as shown in FIG. 13, or both sides as shown in FIG. 8, along the entire height as shown in FIG. 13, or only a portion of the height of the link 20 as shown in FIG. 8.

Referring to FIGS. 4 and 7, the links 20 are formed with horizontal apertures 28 and 30 bored through the apexes 24 and the nadirs 26 of the links 20. The apertures 28 and 30 are dimensioned and aligned to allow connecting rods 14 and 15 to be transversely and horizontally inserted through the pickets 12. The apertures 28 and 30 may be longitudinally elongate in shape to allow the connecting rods 14 and 15 a degree of horizontal freedom relative to the links 20 during operation of the conveyor belt assembly 10. Further, the longitudinally elongate shape of the apertures 28 and 30 allows for ease of cleaning and additional tolerance to facilitate the manufacturing and assembly of the conveyor belt. It will be appreciated that forming the pickets 12 by bending a strand of flat wire is not always a precise process due to, for example, some relaxation of a link once formed by bending.

Referring to FIG. 4, the pickets 12 extend transversely across the width of the conveyor belt assembly 10, and are aligned so that a first picket 12A is aligned with a second adjacent picket 12B, such that the apexes 24 of the triangle shaped links 20 of the second picket 12B overlap in a nested relationship in the open bases 27 of the first picket 12A.

Referring principally to FIGS. 5 and 6, and secondarily to FIG. 2 for reference to the left drive chain 16, the drive chains 16 and 18 are formed from successive sets of opposing linking plates 32 having a first end and a second end. The linking plates 32 are oval shaped planar members having apertures 34 at both end portions 36 of the linking plates 32. The end portions 36 of the successive sets of linking plates 32 are pivotally interconnected by transverse linking rods 38 inserted through the apertures 34, to thereby form the endless elongate drive chains 16 and 18. Well-known limiting means, such as knobs 48, are fixed or otherwise formed on the ends of the linking rods 38 to retain the linking plates 32 between the ends of the linking rods 38.

The linking rods 38 are also inserted through spool members 46. Spool members 46 include an outer roller member 56 rotatably engaged over an inner mounting cylinder 58 that is press fit within and between the apertures 34 of each set of inner linking plates 32 as is well know in the art. The inner diameter of the mounting cylinder 58 is selected to closely accept the linking rods 38 within. The spool members 46 act as spacers, as they maintain the separation of the linking plates 32, and also as rollers, reducing wear and friction between the drive chains 16 and 18 and a drive sprocket 60, as best seen in FIG. 1, of an external drive mechanism (not shown), as will be discussed in more detail below.

Still referring to FIGS. 2, 5 and 6, the linking plates 32 may include intermediate apertures 40 located equidistant between the apertures 34 mentioned above. The apertures 40 are dimensioned to accept the longer connecting rods 14. During assembly, the longer connecting rods 14 are inserted through the intermediate apertures 40 of the linking plates 32 of the left drive chain 16, through the apertures 28 and 30 in the links 20 of the pickets 12 and into the intermediate apertures 40 of the right drive chain 18. The shorter connecting rods 15, located alternately between the longer connecting rods 14, terminate prior to reaching the linking plates 32 and are therefore not coupled to the linking plates 32. Well known limiting means, such as knobs 48, are formed or otherwise fixed on the ends of the connecting rods 14 and 15 to maintain the connecting rods 14 and 15 axial alignment relative to the drive chains 16 and 18. With the connecting rods 14 and 15 arranged as described, the drive chains 16 and 18 are pivotally coupled to the pickets 12 that form the conveying surface 42.

By coupling the connecting rods 14 to the left and right drive chains 16 and 18, a consistent distance is maintained between successive connecting rods 14 and thus between adjacent pickets 12 as measured along the length of the conveyor belt. Therefore, if the conveyor belt assembly 10 of the present invention is used in conjunction with a system that scans and records the position of an object to be portioned relative to the conveyor belt, a constant distance is maintained between successive pickets 12, thereby providing for increased accuracy when the object is later portioned downstream of the scanner.

Every other longer connecting rod 14 utilizes washers 62 at their distal ends. The washers 62 are placed between the end knob 48 and the adjacent linking plates 32. The washers 62 may be the same thickness as the linking plates 32. As apparent to one skilled in the art, the washers 62 allow connecting rod 14 of a uniform length to be used, despite the varying distance between the outboard sides of the left drive chain 16 and the outboard sides of the right drive chain 18, caused by the overlapping arrangement of successive pairs of linking plates 32.

Figure 16:
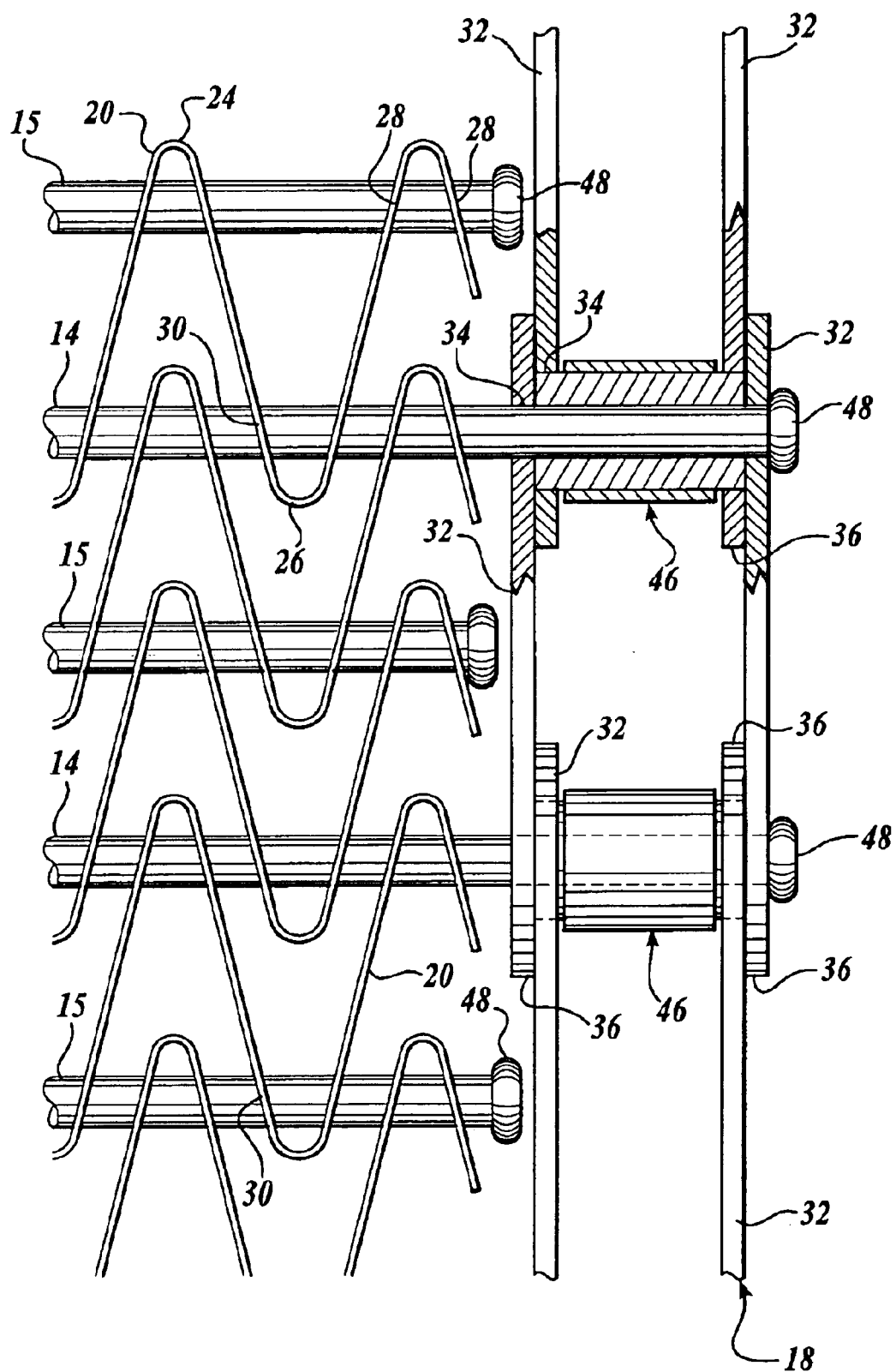
FIG. 16 is a fragmentary plan view of an alternate embodiment of the means for coupling several interconnected pickets of the type shown in FIG. 1 to a drive chain, where a portion of the drive chain is shown in sectional to illustrate the means by which the pickets are attached to the drive chain.

Referring to FIG. 16, an alternate embodiment of the present invention is depicted showing an alternate method of joining pickets 12 to the drive chain 18. In the illustrated embodiment, the longer connecting rods 14 are inserted through apertures 34 and their associated spool members 46 in the linking plates 32 of the left drive chain 16 (see FIG. 2), through apertures 28 and 30 in the links 20 of the pickets 12 and through apertures 34 and their associated spool members 46 in the linking plates 32 of the right drive chain 18. The shorter connecting rods 15, located between the longer connecting rods 14, terminate prior to reaching the linking plates 32 and are therefore not coupled to the linking plates 32. Well known limiting means, such as knob fittings 48, are fixed on the ends of the connecting rods 14 and 15 to maintain the connecting rods 14 and 15 axial alignment in relation to the drive chains 16 and 18.

Figure 17:
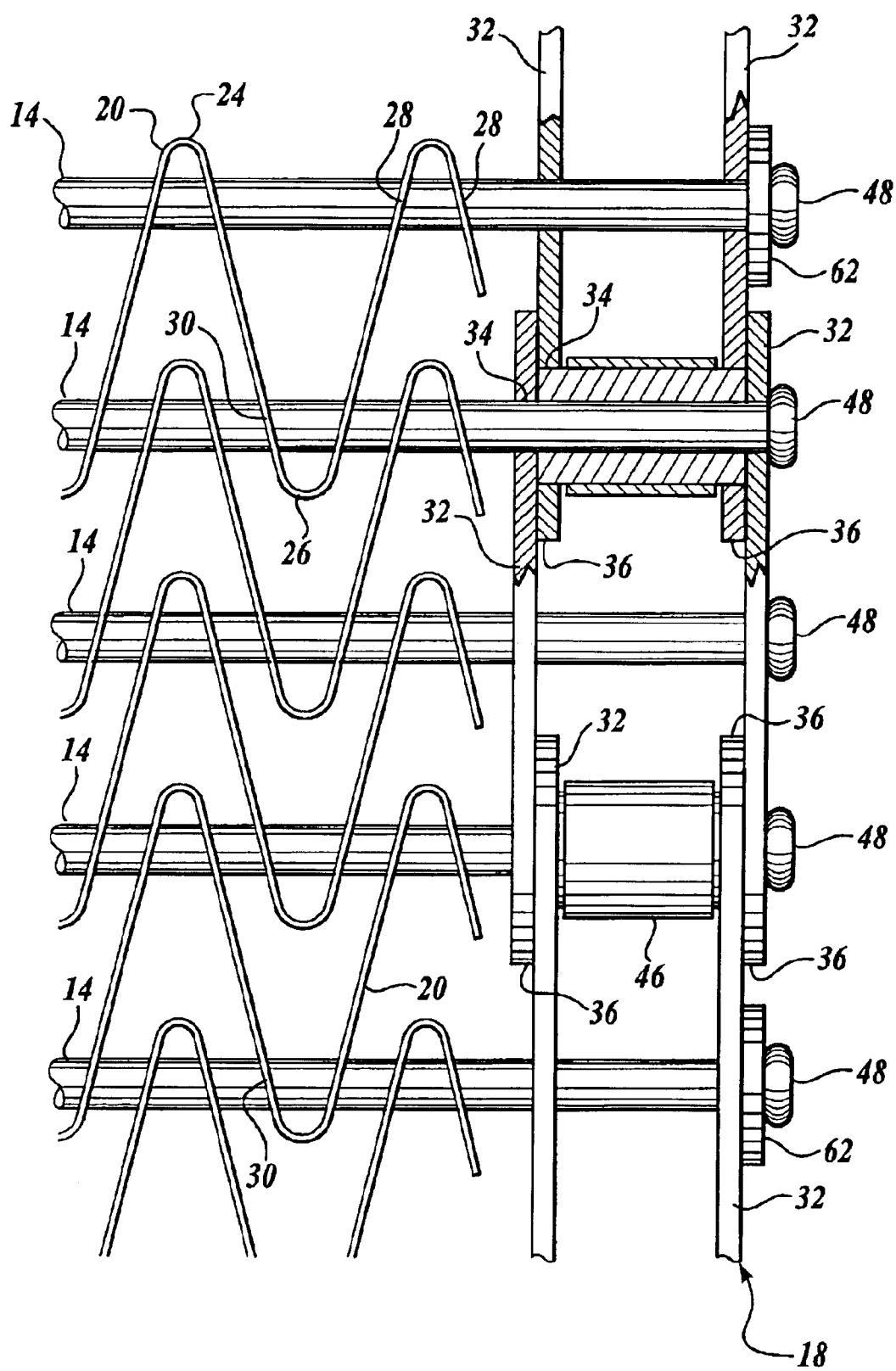
FIG. 17 is a fragmentary plan view of an alternate embodiment of the means for coupling several interconnected pickets of the type shown in FIG. 1 to a drive chain, where a portion of the drive chain is shown in sectional to illustrate the means by which the pickets are attached to the drive chain.

Referring to FIG. 17, an alternate embodiment of the present invention is depicted showing an alternate method of joining pickets 12 to the drive chain 18. In the illustrated embodiment, longer connecting rods 14 are inserted through apertures 34 and 40 of the drive chains 16 (see FIG. 2) and 18. Therefore, during assembly of this embodiment, the longer connecting rods 14 are inserted through apertures 34 and their associated spool members 46 in the linking plates 32 of the left drive chain 16 (see FIG. 2), through apertures 28 and 30 in the links 20 of the pickets 12 and through apertures 34 and their associated spool members 46 in the linking plates 32 of the right drive chain 18. Longer connecting rods 14 are also inserted through apertures 40 in the linking plates 32 of the left drive chain 16 (see FIG. 2), through apertures 28 and 30 in the links 20 of the pickets 12 and through apertures 40 in the linking plates of the right drive chain 18. Well known limiting means, such as knobs 48, are fixed on the ends of the longer connecting rods 14 to maintain the connecting rods 14 axial alignment in relation to the drive chains 16 (see FIG. 2) and 18.

In light of the above description of the components of the conveyor belt assembly 10, the operation of the conveyor belt assembly will now be described. Referring to FIG. 1, an object to be portioned 54 is placed on the conveying surface 42, which is formed by the aggregate of the top surfaces 44 of the links 20. As is well known in the art, the drive chains 16 and 18 are driven by drive sprockets 60 of an external drive mechanism (not shown) to advance the conveying surface 42 and therefore, any object to be portioned 54 placed thereon. Idler sprockets (not shown) and/or other means well know in the art are used to support the conveying surface 42 and the object to be portioned 54 during use. A high-speed fluid jet 52 is directed vertically downward with respect to the conveyor surface 42 from a fluid jet nozzle 50 and upon the conveyed object 54, portioning the object.

Referring to FIGS. 3 and 7, as the fluid jet 52 cuts through the object to be portioned 54, or if the fluid jet 52 is flowing prior to or after the cutting of the object, the links 20 are directly impinged by the fluid jet 52. The tapered upper ends 22 of the links 20 of the present invention slice through the parallel oriented fluid jet 52, minimizing the splash of the fluid jet 52. Reductions in the degree of fluid splash cause a corresponding reduction of fluid released into the work area and in the amount of fluid absorbed by the conveyed product 54.

The tapered shape of the links 20 presents minimal horizontal surfaces, valleys or other obstructive structures that can disrupt the stream flow or increase the potential for the accumulation of spent cutting fluid. Inasmuch as the tapered surfaces of the links 20 cause minimal disruption of the fluid jet 52, the spent fluid of the fluid jet 52 passes rapidly passed the conveyor surface 42 and into a collection system (not shown). Rapid removal of spent fluid from the conveying surface 42 reduces the potential that the object to be portioned 54 will absorb the cutting fluid or for the object to be portioned 54 to be disturbed or floated from its position on the conveying surface 42.

Further, it is contemplated that a vacuum or suction means (not shown) may be disposed beneath the conveyor belt assembly 10 to hold the conveyed product 54 in position, and to receive and contain the downwardly directed fluid jet 52. The tapering of the upper edge portions 22 causes limited disruption of the fluid jet 52, thereby serving to substantially maintain the vertical downward path of the fluid jet 52 directly into a spent fluid collection means employed beneath the conveying surface 42, thereby aiding the collection and containment of the spent cutting fluid. Further, the tapering reduces wear on the conveyor belt, reduces a tendency to shift the conveyor belt, and reduces the likelihood of disrupting the position of the objects on the belt.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A conveyor belt for conveying an object to be portioned by a fluid jet, comprising at least a first and a second picket coupled to one another, the first and second pickets each having a length comprised of a sequence of geometrically shaped links disposed transversely across the conveyor belt, wherein the pickets are disposed in a nested relationship to each other, the pickets comprising upper edge portions that cooperatively form a conveying surface for supporting and advancing the object to be portioned, wherein the upper edge portion lengthwise of the pickets is tapered in the upward direction to reduce dispersion of the fluid jet during impingement of the fluid jet on the conveying surface, and wherein the conveyor belt further includes a connecting assembly for coupling the first picket to the second picket and a drive assembly for engaging and imparting motion to the conveying surface.

2. The conveyor belt of claim 1, wherein the connecting assembly includes a rod, and wherein the first picket is pivotally attached to the second picket by the rod inserted through at least one link of the first picket and at least one link of the second picket.

3. The conveyor belt of claim 1, wherein the links comprising the first and second pickets have a leading end portion of a first shape and a trailing end portion of a second shape, wherein the leading end portions of the links of the first picket may at least be partially received within the trailing end portions of the links of the second picket, thereby allowing the first picket to be at least partially nested within the second picket.

4. The conveyor belt of claim 3, wherein the connecting assembly includes a rod, and wherein the leading end portions and the trailing end portions of the links have apertures, wherein the first picket can be pivotally coupled in the nested relationship to the second picket by aligning the apertures and inserting the rod therethrough.

5. The conveyor belt of claim 1, wherein the pickets are comprised of a sequence of geometrically shaped links selected from a group consisting of triangular shaped links, quadrilateral shaped links, curved shaped links, saw tooth shaped links, and sinusoidal shaped links.

6. The conveyor belt of claim 1, wherein the drive assembly includes a first drive chain and a second drive chain, wherein the first drive chain is positioned along a first side of the conveyor belt and the second drive chain along a second side of the conveyor belt, wherein the drive chains are coupled to the conveying surface and can be driven to impart motion to the conveying surface.

7. The conveyor belt of claim 6, wherein the first and the second drive chains have a plurality of apertures, wherein the connecting assembly includes a connecting rod inserted through the apertures and at least one of the links of the pickets, thereby pivotally coupling the pickets to the first drive chain and the second drive chain.

8. The conveyor belt of claim 7, wherein the plurality of apertures are spaced a predetermined distance from one another along a length of the first and second drive chains, thereby substantially uniformly spacing adjacent pickets from one another.

9. The conveyor belt of claim 1, wherein the upper edge portions of the pickets are linearly tapered.

10. The conveyor belt of claim 1, wherein the upper edge portions of the pickets are roundly tapered.

11. The conveyor belt of claim 1, wherein the upper edge portions of the pickets are concavely tapered.

12. The conveyor belt of claim 1, wherein the upper edge portions of the pickets are convexly tapered.

13. The conveyor belt of claim 1, wherein the upper edge portions of the pickets are step tapered.

14. The conveyor belt of claim 1, wherein the upper edge portions of the pickets are tapered on one side.

15. The conveyor belt of claim 1, wherein the upper edge portions of the pickets are tapered along a portion of the height of the pickets.

16. A conveyor belt for conveying an object to be portioned by a fluid jet, the conveyor belt formed from a plurality of pickets coupled to one another in a nested relationship, each having a length comprised of a sequence of geometrically shaped links disposed transversely across the conveyor belt, the pickets comprising upper edge portions that cooperatively form a conveying surface for supporting and advancing the object to be portioned, wherein the upper edge portions lengthwise of the picket are tapered in the upward direction to reduce dispersion and splash back of the fluid jet during impingement of the fluid jet on the conveying surface, and wherein the conveyor belt includes a plurality of connecting members for connecting the plurality of pickets to one another and a drive assembly for engaging and imparting motion to the conveying surface.

17. The conveyor belt of claim 16, wherein the plurality of connecting members each include a rod, and wherein adjacent pickets are pivotally attached to each other by the rod inserted through adjacent links of the adjacent pickets.

18. The conveyor belt of claim 16, wherein the links comprising the plurality of pickets have a leading end portion of a first shape and a trailing end portion of a second shape, wherein the leading end portions of the links of a first picket may at least be partially received within the trailing end portions of the links of a second picket, thereby allowing the first picket to be at least partially nested within the second picket.

19. The conveyor belt of claim 18, wherein the leading end portions and the trailing end portions of the links have apertures, wherein the first picket can be pivotally coupled in nested relationship to the second picket by aligning the apertures and inserting one of the connecting members therethrough.

20. The conveyor belt of claim 16, wherein the pickets are comprised of a sequence of geometrically shaped links selected from a group consisting of triangular shaped links, quadrilateral shaped links, curved shaped links, saw tooth shaped links, and sinusoidal shaped links.

21. The conveyor belt of claim 16, wherein the drive assembly further comprises a first drive chain and a second drive chain, wherein the first drive chain is positioned along a first side of the conveyor belt and the second drive chain along a second side of the conveyor belt, wherein the drive chains are coupled to the conveying surface and can be driven to impart motion to the conveying surface.

22. The conveyor belt of claim 21, wherein the first and the second drive chains have a plurality of apertures, wherein the connecting members extend through said apertures and at least one of the links of the pickets, thereby pivotally coupling the pickets to the first drive chain and the second drive chain.

23. The conveyor belt of claim 22, wherein the plurality of apertures are spaced a predetermined distance from one another along a length of the first and second drive chains, thereby substantially uniformly spacing adjacent pickets from one another.

24. The conveyor belt of claim 16, wherein the tapering of the upper edge portions of the links is accomplished by a method selected from the group of linear tapering, rounded tapering, concave tapering, convex tapering, stepped tapering, tapering on one side of the links, tapering along the entire height of the links, and tapering along a portion of the height of the links.

25. A conveyor belt for conveying an object to be portioned by a fluid jet, comprising a first endless member and a second endless member, wherein the first endless member is positioned along a first side of the conveyor belt and the second endless member along a second side of the conveyor belt, wherein the first and second endless members are coupled to a conveying surface and can be driven to impart motion to the conveying surface; and wherein the conveying surface is comprised of a plurality of pickets, each having a length comprised of a sequence of geometrically shaped links disposed transversely across the conveyor belt between the first and second endless members and in a nested relationship to one another, the pickets comprising upper edge portions that form the conveying surface for supporting and advancing the object to be portioned, wherein the upper edge portions lengthwise of the picket are tapered in the upward direction to reduce dispersion and splash back of the fluid jet during impingement of the fluid jet on the conveying surface, and wherein the conveyor belt further comprises at least one connecting member for coupling two or more of the plurality of pickets to one another.

26. The conveyor belt of claim 1, wherein the drive assembly includes a rotating member, wherein the conveyor belt at least partially encircles the rotating member, and wherein the rotating member is adapted to be driven to impart motion to the conveying surface.

27. The conveyor belt of claim 16, wherein the drive assembly includes a rotating member, wherein the conveyor belt at least partially encircles the rotating member, and wherein the rotating member is adapted to be driven to impart motion to the conveying surface.

* * * * *

UNITED STATES PATENT AND TRADEMARK OFFICE
CERTIFICATE OF CORRECTION

PATENT NO.    : 6,854,590 B2
DATED         : February 15, 2005
INVENTOR(S)   : N.A. Rudy et al.

It is certified that error appears in the above-identified patent and that said Letters Patent is hereby corrected as shown below:

Column 10,
Line 25, "in nested relationship" should read -- in the nested relationship --

Signed and Sealed this

Nineteenth Day of July, 2005

JON W. DUDAS
*Director of the United States Patent and Trademark Office*